United States Patent [19]

Gawol et al.

[11] Patent Number: 4,921,540
[45] Date of Patent: May 1, 1990

[54] CORROSION INHIBITING PIGMENTS BASED ON ZINC SILICATE THEIR PRODUCTION AND THEIR USE

[75] Inventors: Manfred Gawol, Clausthal-Zellerfeld; Gerhard Adrian, Goslar, both of Fed. Rep. of Germany

[73] Assignee: Dr. Hans Heubach GmbH & Co. KG, Langelsheim, Fed. Rep. of Germany

[21] Appl. No.: 26,694
[22] PCT Filed: Aug. 28, 1986
[86] PCT No.: PCT/EP86/00505
§ 371 Date: Mar. 13, 1987
§ 102(e) Date: Mar. 13, 1987
[87] PCT Pub. No.: WO87/01714
PCT Pub. Date: Mar. 26, 1987

[30] Foreign Application Priority Data

Sep. 13, 1985 [DE] Fed. Rep. of Germany ....... 3532806

[51] Int. Cl.$^5$ .............................................. C03C 3/066
[52] U.S. Cl. ........................... 106/287.34; 106/14.05; 106/14.39; 106/425
[58] Field of Search .............. 106/288 B, 14.21, 14.33, 106/286.8, 287.19, 287.34, 14.39, 425, 489, 482, 484, 14.05; 427/376.4

[56] References Cited

U.S. PATENT DOCUMENTS

| | | | |
|---|---|---|---|
| 3,874,883 | 4/1975 | Robitaille et al. | 106/14.21 |
| 3,939,295 | 2/1976 | Robertson et al. | 427/376.4 |
| 4,460,630 | 7/1984 | Nishino et al. | 427/376.4 |
| 4,476,090 | 10/1984 | Heidsiek et al. | 501/19 |

OTHER PUBLICATIONS

Derwent Abstract Accession No. 81-18434D/11, Japanese Patent No. J56005349-A, Jan. 20, 1981.
Derwent Abstract Accession No. 85-039433/07, European Patent No. 132810, Feb. 13, 1985.
Derwent Abstract Accession No. 85-119954/20, Japanese Patent No. 60060942, Apr. 18, 1985.
Derwent Abstract Accession No. 85-053725/09, Japanese Patent No. 60011247, Jan. 21, 1985.
Derwent Abstract Accession No. 85-281638/45, Russian Patent No. 1152940, Apr. 30, 1985.
Derwent Abstract Accession No. 79-78297B/43, Japanese Patent No. 54119513, Sep. 17, 1979.

*Primary Examiner*—Amelia Burgess Yarbrough
*Attorney, Agent, or Firm*—Venable, Baetjer, Howard & Civiletti

[57] ABSTRACT

Corrosion inhibiting pigments on the basis of zinc silicate are produced from 35–65% by weight of ZnO, 15–35% by weight of $SiO_2$, 5–20% by weight of $B_2O_3$, and 1–20% by weight of $WO_3$ which can be entirely or partly substituted by, $MoO_3$ and/or $SnO_2$ wherein the amount of zinc silicate, boron oxide and, if necessary, the other metal oxides or their hydrates singly or in a combination thereof is such that the entire combination with the zinc silicate and the boron oxide contains at least one of the oxides $WO_3$, $MoO_3$ and/or $SnO_2$ in amounts bringing the balance to 100%. The pigments can be manufactured by dry mixing of the components, melting for 1–3 hours at 1100° C.–1400° C. and subsequent grinding to desired fineness.

4 Claims, No Drawings

CORROSION INHIBITING PIGMENTS BASED ON ZINC SILICATE THEIR PRODUCTION AND THEIR USE

This invention relates to corrosion inhibiting pigments not injurious to health, a process for their manufacture and the application of the pigments.

The pigments are based on zinc silicate which is modified with $B_2O_3$ and, if necessary, with further oxide-type complexing agents or oxides which are able to form complex polyacids or heteropolyacids.

Lead pigments, known for good anti-corrosive properties, have been used in many ways to manufacture corrosion inhibiting coating systems. In addition to red lead (minimum) and lead silicochromate, lead silicate has also been used most notably for electrophoretic coatings in the automobile industry. The corrosion resistance of pieces coated in the electrophoretic process improves significantly due to the presence of lead silicate in the non-volatile matter of the coating.

Since lead compounds are classified as substances creating health hazards, efforts have been made to develop lead-free pigments which would still exhibit the same or better corrosion inhibiting properties as the exemplary lead silicates.

Attempts were made to substitute lead silicate with zinc silicate. However, those did not provide pigments having the required rust-protection activity.

According to the invention, corrosion inhibiting pigments based on zinc silicate are produced from 35–65% by weight of ZnO, 15–35% by weight of $SiO_2$, 5–20% by weight of $B_2O_3$ and 1–20% by weight of $WO_3$, entirely or partly substituted by $MoO_3$ annd/or $SnO_2$, wherein the amount of, zinc silicate, boron oxide and, if necessary, other metal oxides or their hydrates, singly or in a combination thereof, are such that the entire combination with zinc silicate and the boron oxide contains at least one of the oxides $WO_3$, $MoO_3$ and/or $SnO_2$ in amounts constituting the balance of 100%.

It has appeared that the melting together of the components of the carrier (zinc silicate) with the above-specified oxides singly or in combination results in corrosion inhibiting pigments that produce clearly higher active rust-protection effect than that of zinc silicate alone. As well, the pigments provide the same or better corrosion protection than lead silicate used so far for specific applications.

The pigments may be produced from ZnO, $SiO_2$ and $B_2O_3$ as well as $WO_3$ which can be substituted entirely or partly by $MoO_3$ and/or $SnO_2$, so that the pigment contains at least 4 components. However, if one or more of the oxides $WO_3$, $MoO_3$ and $SnO_3$ are added, boron trioxide should be added preferably in an amount of 5–10% by weight. It is even more advantageous to introduce 47–60% by weight of ZnO and 15–25% by weight of $SiO_2$ as well as boron trioxide in the above-specified amount range, and at least one oxide from the group consisting of $WO_3$, $MoO_2$ and $SnO_2$, the amounts being 5–10% $WO_3$, 5–15% $MoO_3$ and 5–10% $SnO_2$.

The pigment is produced by melting together raw materials at a temperature from 1100° C. to 1400° C. for a period of 1–3 hours, preferably at ca. 1200° C. for about 2 hours.

The products thus obtained are cooled down, granulated and wet-comminuted to the required fineness, for example in a ball mill. The preferred way of granulation is to pour the melt (molten mass) into the water.

The wet-comminution of the mass containing 70% of solids to the desired fineness is acccompanied by a partial hydrolysis resulting in hydrated molecules which can be applied advantageously to form adhesion complexes in combination with corresponding binding agents and the metal substrate.

Another advantage of this process is the possibility to obtain the pigment in the form of a paste with high solids content. Thus, the primary particle size and particle fineness remain unchanged and the formation of agglomerates that usually occurs during drying is eliminated.

In order to be applicable in a solvent-containing product, the pigments must be pulverized. To this end, the pigments after wet-comminution are dried out and subjected to a further preparation treatment (grinding, screening), whereupon they can be used as moisture-free pigments.

The invention is explained in more detail by the following examples which also show the composition of the modified pigments by the percentage of their oxide components.

EXAMPLE 1

The following table shows the percentage of oxides constituting the pigments of the invention. In each case, the oxides were melted in a furnace at a temperature of 1200° C. at the specified weight ratio. After the temperature was reached, the molten mass was kept at that temperature for about 2 hours. At the end of the reaction, the molten mass was poured into a water bath and the resulting granulate was separated.

The granulate was transferred to a ball mill and comminuted at the standard solids content. The grinding time was selected according to the desired fineness as the final particle sizes should not exceed 15 um.

Subsequently, the solids content of the comminuted paste-like material was adjusted to 70%. In this form, the material was ready to use in so-called "aqueous coating systems".

TABLE 1

| (percentage by weight indicated throughout) | | | | | |
|---|---|---|---|---|---|
| ZnO % | $SiO_2$ % | $B_2O_3$ % | $WO_3$ % | $MoO_3$ % | $SnO_2$ % |
| 59.7 | 22.0 | 18.3 | — | — | — |
| 53.8 | 19.8 | 16.5 | 9.9 | — | — |
| 63.6 | 15.6 | 13.0 | — | 7.8 | — |
| 60.4 | 15.3 | 17.3 | — | — | 7.8 |
| 46.6 | 22.9 | 15.3 | 7.6 | 7.6 | — |
| 41.1 | 25.3 | 17.6 | — | 10.5 | 5.5 |
| 50.4 | 21.3 | 12.4 | 8.8 | — | 7.1 |

The modified zinc-silicate based pigments of the invention were examined in water-dilutable binding compositions, particularly in electroimmersion priming where the pigmentation level was 1–5%, preferably 3%. It appeared that short-time tests (salt-spray test, DIN 50021 and perspiration test, DIN 50017) revealed a very good corrosion inhibiting activity of the pigments, the activity being equivalent to or in some cases higher than that of the lead silicates used so far.

EXAMPLE 2

The procedure is similar to Example 1. Subsequently, the pigment slurry is dried up at 105° C. in a rack drying apparatus. The resulting agglomerates are ground by means of a turbo-grinder or in a pinned-disk mill and, if necessary, sifted by means of an air sifter.

After the upgrading, the pigments in a dry powder form were subjected again to short-time tests as part of alkyd resin, epoxyesther resin and binary epoxy and polyurethane resin systems, wherein the pigmentation level was 5–15%, preferably 10%. Again, excellent corrosion inhibiting properties wre recorded, equal to or better than those characteristic of lead silicate.

The wet grinding and dry grinding may be accomplished by means of all devices known in the art of wet and dry comminution. In wet grinding, a solids content of 70% (plus or minus 2–3%) should be maintained to achieve a higher fineness in a reasonable period of time.

We claim:

1. A lead-free corrosion inhibiting zinc silicate based pigment obtained by melting together the composition consisting essentially of
   (a) between about 35 and 65 weight percent of ZnO,
   (b) between about 15 and 35 weight percent of $SiO_2$,
   (c) between about 5 and 20 weight percent of $B_2O_3$, and
   (d) between about 1 and 20 weight percent of an oxide selected from the group consisting of $WO_3$, $MoO_3$, $SnO_2$ and combinations thereof.

2. The pigment of claim 1 wherein the element (d) of said composition consists of between 5 and 10 weight percent of $WO_3$.

3. The pigment of claim 1 wherein element (d) of said composition consists of between about 5 and 10 weight percent of $SnO_2$.

4. The pigment of claim 1 wherein element (d) of said composition consists of between about 5 and 15 weight percent of $MoO_3$.

* * * * *